(12) United States Patent
Lu

(10) Patent No.: US 6,604,828 B2
(45) Date of Patent: Aug. 12, 2003

(54) OPTICAL PROJECTOR USING REFLECTIVE LIQUID CRYSTAL PANELS

(75) Inventor: Ho Lu, Shin-Chu (TW)

(73) Assignee: Postech Corp. (TW)

( * ) Notice: Subject to any disclaimer, the term of this patent is extended or adjusted under 35 U.S.C. 154(b) by 0 days.

(21) Appl. No.: 09/753,580

(22) Filed: Jan. 4, 2001

(65) Prior Publication Data

US 2002/0003609 A1 Jan. 10, 2002

(30) Foreign Application Priority Data

Jul. 5, 2000 (TW) .......................... 89113267 A

(51) Int. Cl.[7] ................. G03B 21/00; G03B 21/14
(52) U.S. Cl. ...................... 353/33; 353/20; 353/84
(58) Field of Search ......................... 353/51, 20, 84, 353/33, 34, 31; 359/9; 348/743

(56) References Cited

U.S. PATENT DOCUMENTS 5,716,122 A * 2/1998 Esaki et al. .................. 353/33
6,227,670 B1 * 5/2001 Numazaki et al. ............. 349/9
6,280,034 B1 * 8/2001 Brennesholtz ............... 348/742
6,340,230 B1 * 1/2002 Bryars et al. ................. 353/31
6,364,488 B1 * 4/2002 Lin ............................... 353/31
6,390,626 B2 * 5/2002 Knox ........................... 353/20
6,457,831 B1 * 10/2002 Chuang et al. .............. 353/33

* cited by examiner

Primary Examiner—Russell Adams
Assistant Examiner—Andrew Sever
(74) Attorney, Agent, or Firm—Lowe Hauptman Gilman & Berner, LLP

(57) ABSTRACT

The present invention generally relates to an optical projecting system having a light generating means, a light splitting and synthesizing means, a beam polarization converter, a red light reflective crystal panel, a green light reflective crystal panel, a blue light reflective liquid crystal panel and a projecting lens. The beam polarization converter polarizes lights to a specific polarization distribution. Further the light splitting and synthesizing means splits the polarized light to three beams with different colors respectively. Thus, three different color beams are modulated by three reflective liquid crystal panels to produce three color projecting beams. After the light splitting and synthesizing means synthesizes the color projecting beams, the synthesized projecting light is emitted out via the projecting lens.

24 Claims, 11 Drawing Sheets

OPTICAL PROJECTOR USING REFLECTIVE LIQUID CRYSTAL PANELS

BACKGROUND OF THE INVENTION

1. Field of the Invention

The present invention generally relates to an optical projecting system utilizing liquid crystal panels. Particularly, an optical projector utilizes reflective liquid crystal panels for saving space and simplifies the assembly and calibration of an optical projecting system.

2. Background Description

Recently, liquid crystal optical projecting system has been accepted by companies. The companies use projectors accompanying with desktop or notebook computers for visual display in meetings. The principle of the projector is directed to that the light is split to three color beams, which are a red color beam (R), a green color beam (G) and a blue color beam (B). The three color beams (R, G and B) are transmitted to three liquid crystal panels. The liquid crystal panels receive the signals from a signal source then modulates the three color beams by changing illumination and/or polarization. Further, by a dichroic prism or dichoric mirror, the three modulated color beams will be synthesized to projecting light and be transmitted through a projecting lens to a screen for carrying out the electric signals to a visual display.

FIG. 1 shows a traditional liquid crystal optical projecting system. A light source 10 outputs a light 101. The light 101 is reflected by a mirror 15a then transmitted to dichroic mirrors 16a, 16b. The light 101 is therefore split into a red beam 102, a green beam 103 and a blue beam 104. The three color beams route to lenses 14a, 14b, 14c and transparent liquid crystal panels 11, 12, 13 respectively for being modulated to a red projecting beam 106, a green projecting beam 107 and a blue projecting beam 108. After routing through dichroic mirrors 16c, 16d, the three color beams are synthesized to a projecting light 109 which can be projected broadly to a screen 18.

Another traditional liquid crystal projecting system 2 is illustrated in FIG. 2. A light source 20 illuminates a light 201. Similarly to the previous system, the light 20 is reflected and routed through the dichroic mirrors 26a, 26b then be split to a red beam 202, a green beam 203 and a blue beam 204. After being reflected through respective mirrors 25b, 25c, 25d, the three color beams are transmitted into respective lenses 24a, 24b, 24c and respective transparent liquid crystal panels 21, 22, 23 for being modulated and transformed to a red projecting beam 206, a green projecting beam 207 and a blue projecting beam 208. The three projecting beams 206, 207, 208 are emitted into a synthesizing prism 29 from different directions respectively. The synthesizing prism 29 synthesizes the three projecting beams into a projecting light 209. By a projecting lens 27, the projecting light 27 can be projected into a screen 28 with an enlarged size.

The above mentioned traditional liquid crystal projecting systems both require different dichroic prisms or dichroic mirrors for splitting a light into three color beams. By arranging positions, the three color beams are passing predetermined routes. Then the three color beams are synthesized to a projecting light via dichroic prisms, dichroic mirrors or a synthesizing prism, shown in FIGS. 1 and 2. In this case, the projecting system requires more space for containing such means and the size of the projecting system cannot be minimized, which incurs higher cost. Moreover, the process of synthesizing three color beams to a projecting light requires highly precise calibration and alignment of every element employed in the system. After satisfying the highly precision requirement, the three color beams can be synthesized perfectly. The projecting system suffers burdens due to such high precision requirements. As shown in FIG. 2, the synthesizing prism 29 includes four prisms. The beams 206, 207 and 208 emitted from three different directions are all required to pass the center line of the prism 29 in order to get good resolution. However, when a higher resolution is urged, it would be very difficult to manufacture the synthesizing prism 29 under such high precision requirements.

Furthermore, due to the traditional liquid crystal panels are independently set in different predetermined positions, it would enhance the difficulties of calibration and alignment. Especially when the resolution of the liquid crystal panel in a projecting system is required to be increased or the size of the liquid crystal panel in a projecting system is required to be minimized, the difficulty of assembly and the cost should be doubled or dramatically increased.

SUMMARY OF THE INVENTION

It is therefore an object of the present invention to provide an optical projector having a light splitting and synthesizing means with a polarization coating layer for minimizing the volume of the projecting system.

It is another object of the present invention to provide a simplified structure and assembly processes of an optical projector by integrating liquid crystal panels and supporting circuitry on a single substrate.

According to the present invention, after providing the polarization coating layer utilized in the splitting and synthesizing means, and an integrated circuit substrate having aligned liquid crystal panels and/or supporting circuitry, the volume and alignment process of the optical projector can be effectively reduced without giving up perfect resolution.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
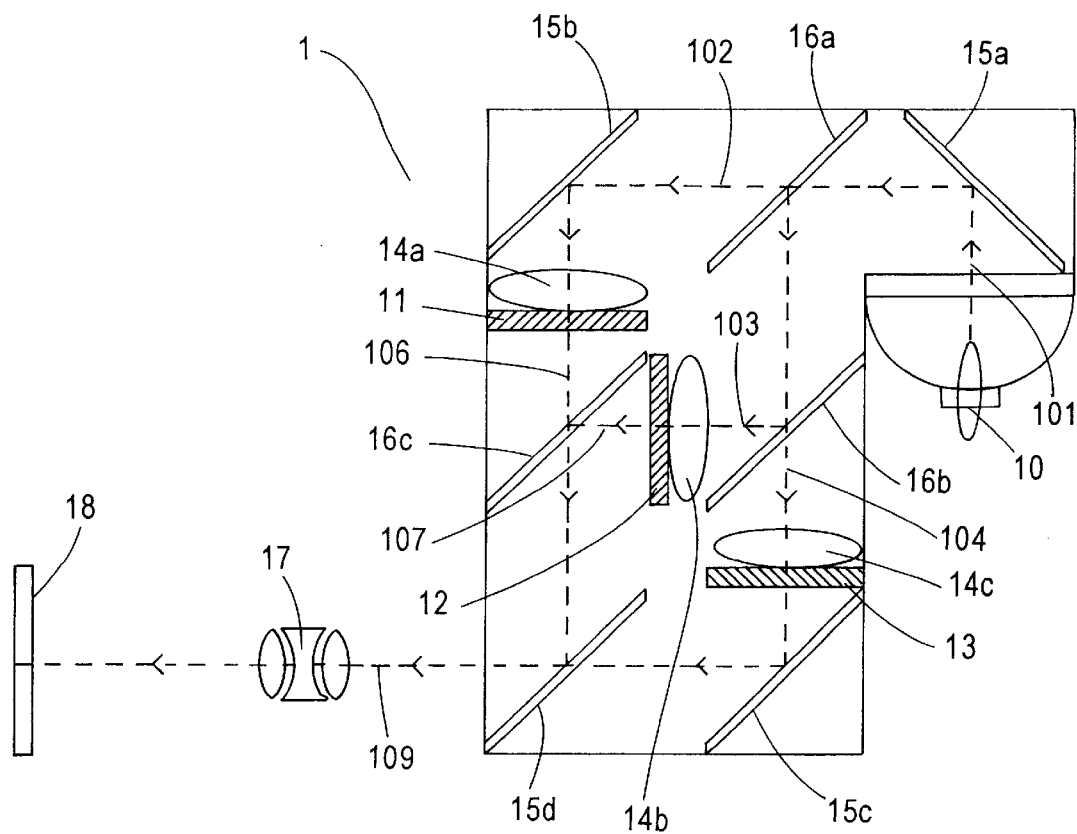
FIG. 1 is a schematic demonstration of a Traditional liquid crystal projecting system.
Figure 2:
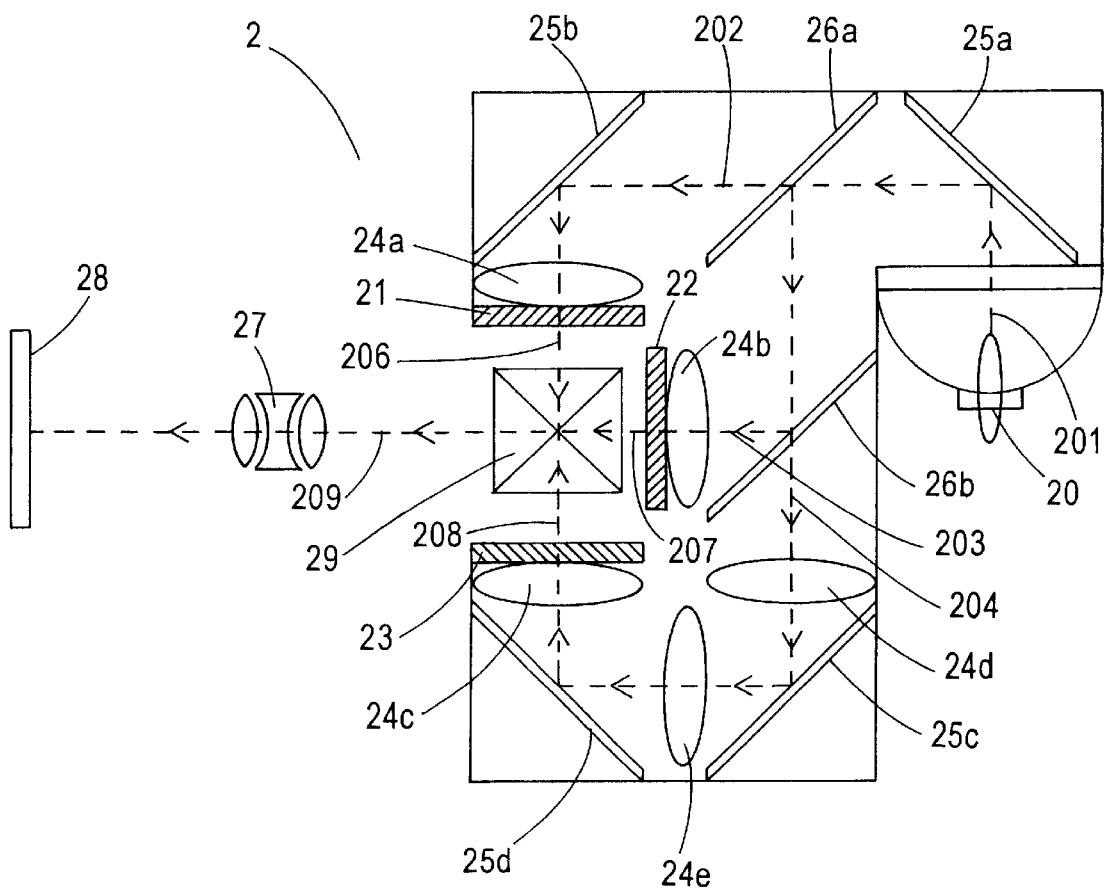
FIG. 2 is a schematic demonstration of another traditional liquid crystal projecting system.
Figure 3:
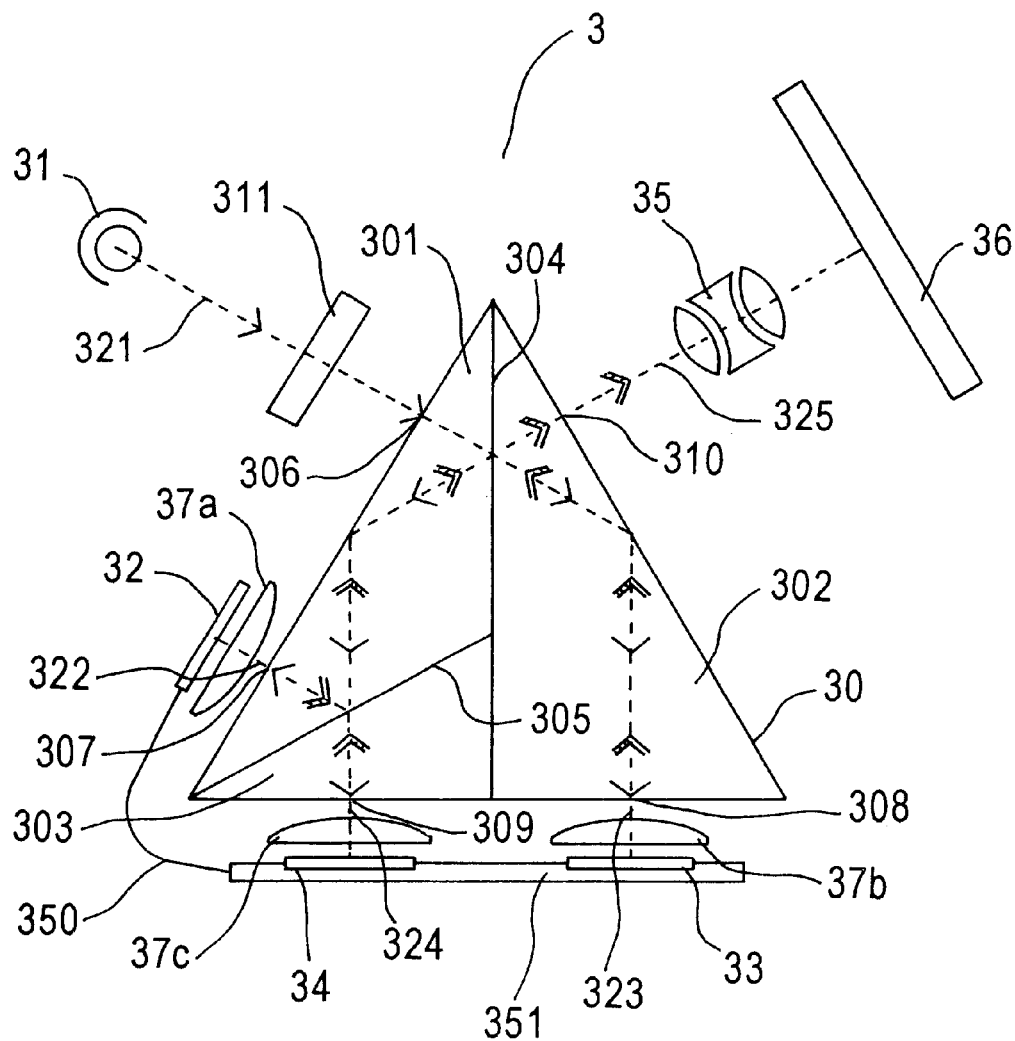
FIG. 3 shows the first embodiment of the present invention.

The first embodiment of the present invention is shown in the FIG. 3. The projecting system 3 includes a light generating device 31, a beam polarization converter 311, a light splitting and synthesizing device 30, a red light reflective liquid crystal panel, a green light reflective liquid crystal panel, a blue light reflective liquid crystal panel and a projecting lens. The light splitting and synthesizing device 30 split a light into three color beams. The three color beams further are modulated by three reflective liquid crystal panels. The light splitting and synthesizing device 30 is also able to synthesize three color projecting beams, which are reflected by the three reflective liquid crystal panels, to a projecting light. The detailed structure and principles are illustrated as follows.

The light generating device 31 generates a light 321. The light 321 usually is a white light. The light 321 passes a beam polarization converter 311 for forming the light 321 with a specific polarization distribution, then transmitted into the light incoming port 306 of the light splitting and synthesizing device 30. Thus, a red beam 322 is outputted from a red beam transporting port 307. A green beam 323 is outputted from a green beam transporting port 308. A blue beam 324 is outputted from a blue beam transporting port 309. The three color beams 322, 323, 324 are therefore modulated to a red projecting beam, a green projecting beam and a blue projecting beam respectively by a red light reflective liquid crystal panel 32, a green light reflective liquid crystal panel 33 and a blue light reflective liquid crystal panel 34. The three color projecting beams are reflected by the liquid crystal panels and thus transmitted back to the red beam transporting port 307, the green beam transporting port 308 and the blue beam transporting port 309 respectively as shown in FIG. 3. The light splitting and synthesizing device synthesizes the three color projecting beams into a projecting light 325, outputting from the light outgoing port 310. By a projecting lens 35, the projecting light 325 is projected on a screen 36.

The splitting and synthesizing device 30 is a prism having a triangular shaping section. The splitting and synthesizing device 30 includes a first component 301, a second component 302 and a third component 303. The first component 301 is a prism having a section of isosceles triangular. The bottom side of the first component 301 is the same side of the light splitting and synthesizing device 30. The cross section area of the first component 301 is one third of the size of the light splitting and synthesizing device 30. The cross section area of the second component 302 is half of the size of the light splitting and synthesizing device 30. The third component 303 accompanying with the first component 301 is equal to the half size of the light splitting and synthesizing device 30. The integrated shape of the first component 301, the second component 302 and the third component 303 is a triangular shape as shown in the FIG. 3. In the surface between the first component 301 and second component 302, there is formed a coating layer, for instance, a polarization beam splitter 304 (PBS). The PBS 304 is able to reflect a Specified polarized light (e.g., S-State polarized light) and pass another specified polarized light (e.g., P-State polarized light).

Due to the arrangement of the light splitting and synthesizing device 30 and the three color reflective liquid crystal panels, the light splitting and synthesizing device 30 and the reflective liquid crystal panels can be formed adjacent in one substrate in order to achieve the perfect calibration and alignment, during wafer manufacture. For a simplified example, the green light reflective liquid crystal panel 33 and the blue light reflective liquid crystal panel 34 can be manufactured in one substrate 351 in the same time. Moreover, the supporting circuitry (e.g., driving IC, controller, . . . etc.) can also be formed in the same substrate 351. The relative positions of the liquid crystal panels can be formed previously during the manufacturing process to match the green light transporting port 308 and the blue light transporting 307 of the light splitting and synthesizing device 30. Furthermore, a soft cable 350 can be utilized to connect the red light reflective liquid crystal panel 32 and the substrate 351. Other controlling circuits and integrated circuits can be manufactured in the same substrate 351. In this case, the assembly for the green and blue light reflective liquid crystal panels is simplified and achieving great precision. Beside, the necessary and required space of the projecting system is effectively reduced.

Figure 4A:
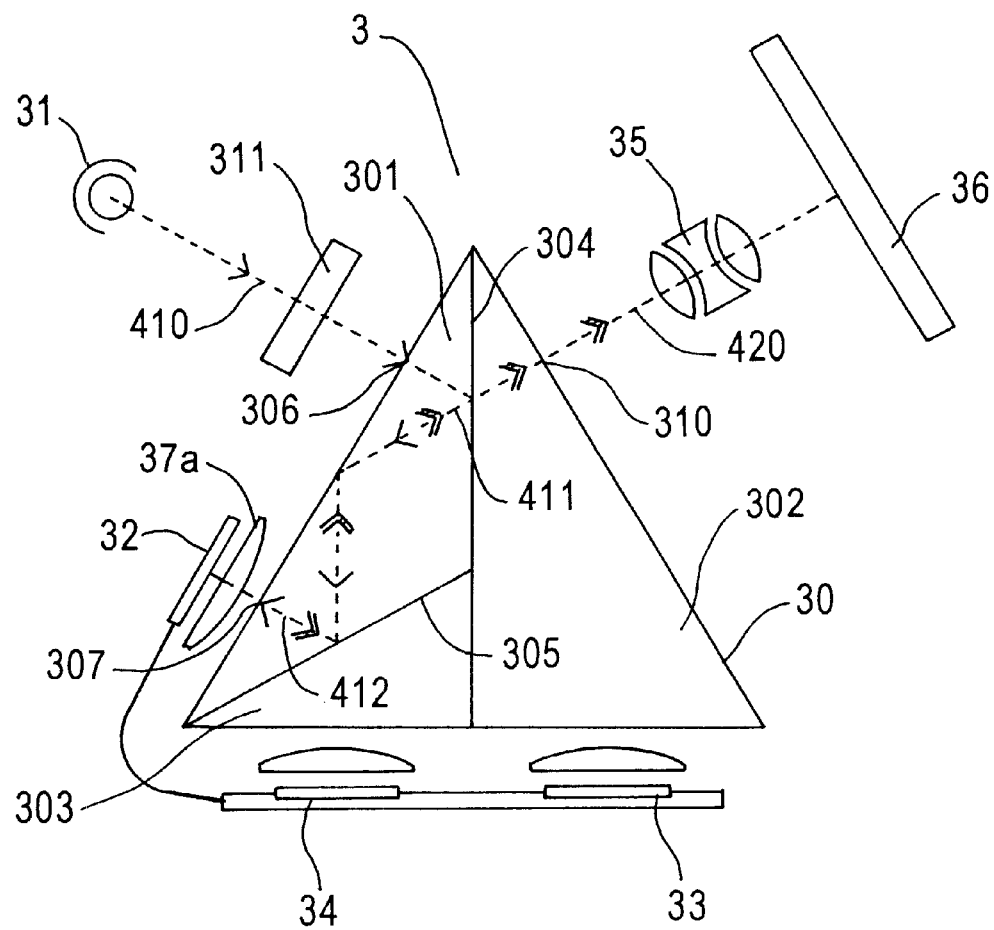
FIG. 4A shows the optical path of the red beam of the first embodiment of the present invention.
Figure 4B:
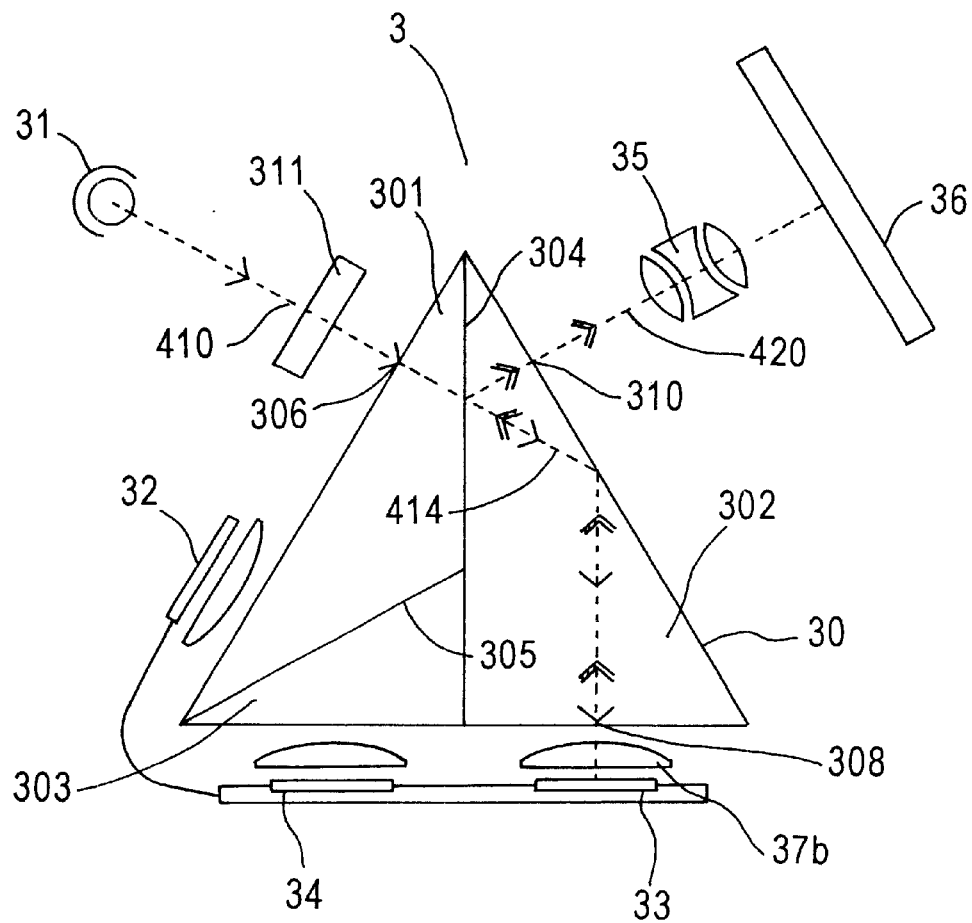
FIG. 4B shows the optical path of the green beam of the first embodiment of the present invention.
Figure 4C:
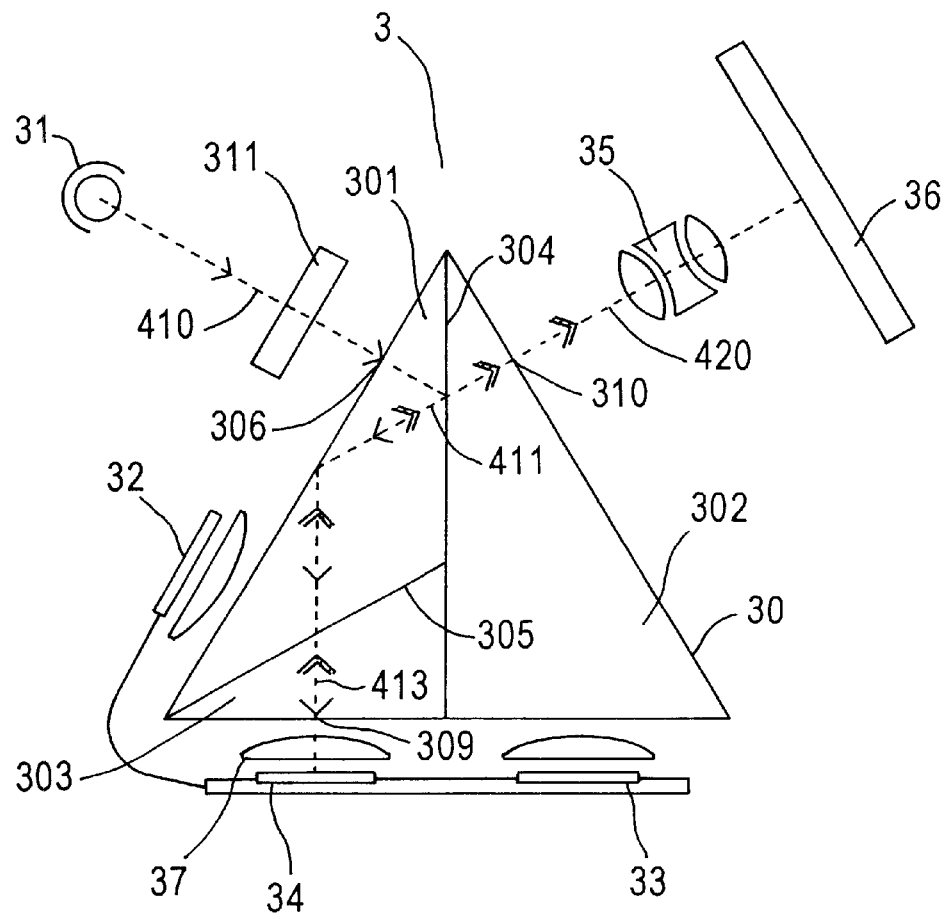
FIG. 4C snows the optical path of the blue beam of the first embodiment of the present invention.

In advance, FIGS. 4A, 4B and 4C illustrates the optical paths inside the light splitting and synthesizing device 30. The optical paths of the red beam is illustrated in FIG. 4A. The light incoming port 306 of the light splitting and synthesizing device 30 receives the light 410 from the light generating device 31. Later the red light, green light and the blue light of the light 410 are therefore polarized to a specified distribution states by the beam polarization converter 311. In the embodiment of the present invention, the green light is polarized to P-State, red and blue lights are polarized to S-State. The polarized lights are transmitted into the first component 301 through the PBS 304. Due to the PBS 304 only allows P-State light to pass. The green light with P-State is allowed to pass the PBS 304. However, the red and blue lights with S-State is unable to be advanced and therefore be reflected back via an optical path 411. When the red and blue lights are total internal reflected through the boundary of 301 to another thin film coating layer (called Dichroic Mirror, or DM) PBS 305. Due to the DM 305 is specified to let blue light pass. The red light is reflected by the DM 305 via another optical path 412. The red light is able to pass the red light transporting port 307 of the light splitting and synthesizing device 30, to be a red beam. The red beam therefore is transmitted to the red light reflective liquid crystal panel 32. The red light reflective liquid crystal panel 32, by referring displaying signals from a signal source (not shown in the figures), modulates and changes the polarization state of the red beam. The modulated red projecting beam then be reflected to the red light transporting port 307, via the optical path 412, the DM 305 and total internal reflected by one side of the first component 301, to the PBS 304. Since the red beam has been modulated by the red light liquid crystal panel 32, the red beam contains different states of polarization, for example, a part of the red beam is P-State and other part of the red beam is S-State. During the red beam passing the PBS 304, the part of red beam with S-state polarization of the PBS 304 is unable to pass for example. In this case, the modulated red beam can carry out displaying signals to a visual display via the light outgoing port 310 and the projecting lens to the screen 36.

In addition, FIG. 4B shows the optical path of the green beam. During the light 410 passing to the beam polarization converter 311, the green light is polarized to P-State polarization, red and blue lights are polarized to S-State polarization. The polarized lights are transmitted into the first component 301 through the PBS 304. Due to the PBS 304 only allows P-State light to pass. The green light with P-State polarization is allowed to pass the PBS 304, and be transmitted into the second component 302 via the optical path 414. After the green light being total internal reflected by the side of the second component 302, a green beam is transmitted outside the light splitting and synthesizing device 30 from the green light transporting port 308, to the green light reflective liquid crystal panel 33. The green light reflective liquid crystal panel 33, by referring displaying signals from a signal source (not shown in the figures), modulates and changes the polarization state of the green beam, to a green projecting beam. The modulated green projecting beam is reflected to the green light transporting port 308, via the optical path 414, and later total internal reflected by one side of the second component 302, to the PBS 304. Since the green beam has been modulated by the green light liquid crystal panel 33, the green beam contains different states of polarization. Since the PBS 304 can let specified polarization beam to be passed or not, part of the modulated green projecting beam is able to be fully reflected by the PBS 304. In this case, the modulated green projecting beam can carry out the displaying signals to a visual display via the light outgoing port 310 and the projecting lens 35 to the screen 36.

FIG. 4C shows the optical path of the blue beam. The path of the blue beam is similar to the path of the red beam illustrated in the above. First, the blue light is spilt by the DM 305 and transmitted into the third component 203, via an optical path 413. By the blue light transporting port 309 of the light splitting and synthesizing device 30, a blue beam is transmitted to the blue light reflective liquid crystal panel 34. The blue light reflective liquid crystal panel 34, by referring displaying signals from a signal source (not shown in the figures), modulates and changes the polarization state of the blue beam, to a blue projecting beam. The modulated blue projecting beam is reflected back to the blue light transporting port 309, via the optical path 413, passing the DM 305, and later total internal reflected by one side of the first component 301, to the PBS 304. Since the blue projecting beam has been modulated by the blue light liquid crystal panel 34, the blue projecting beam contains different states of polarization. Since the PBS 304 can let specified polarization beam to be passed, only part of the modulated blue projecting beam light is therefore able to be fully transmitted through by the PBS 304. In this case, the modulated blue beam can carry out the displaying signals to a visual display via the light outgoing port 310 and the projecting lens 35 to the screen 36.

In view of the above, the three color projecting beams (red, green and blue) are synthesized to one projecting light during passing the PBS 304, and carrying out a visual display to the screen 36 via the projecting lens 35.

Since the light splitting and synthesizing device 30 have the features for splitting a white light to three color beams and for synthesizing three color projecting beams to a projecting light, the dichoric and reflecting mirrors utilized in the traditional projecting system can be eliminated. Thus, the space and size of the projecting system can be saved and further save the problems incurred by utilizing the dichoric and reflecting mirrors. In addition, if the green reflective liquid crystal panel 33 and the blue reflective liquid crystal panel 34 can be formed in the same substrate 351, the relative position of both panels can be fixed during the panel manufacturing process and no needs to make further precise alignment. Therefore, the precise alignment and calibration can be achieved. Besides, both panels are fixed within a predetermined distance, the misalignment is not intruded by the outside environment, such as sudden shock and incidentally dropping. The stability of the projecting system is achieved.

Figure 5A:
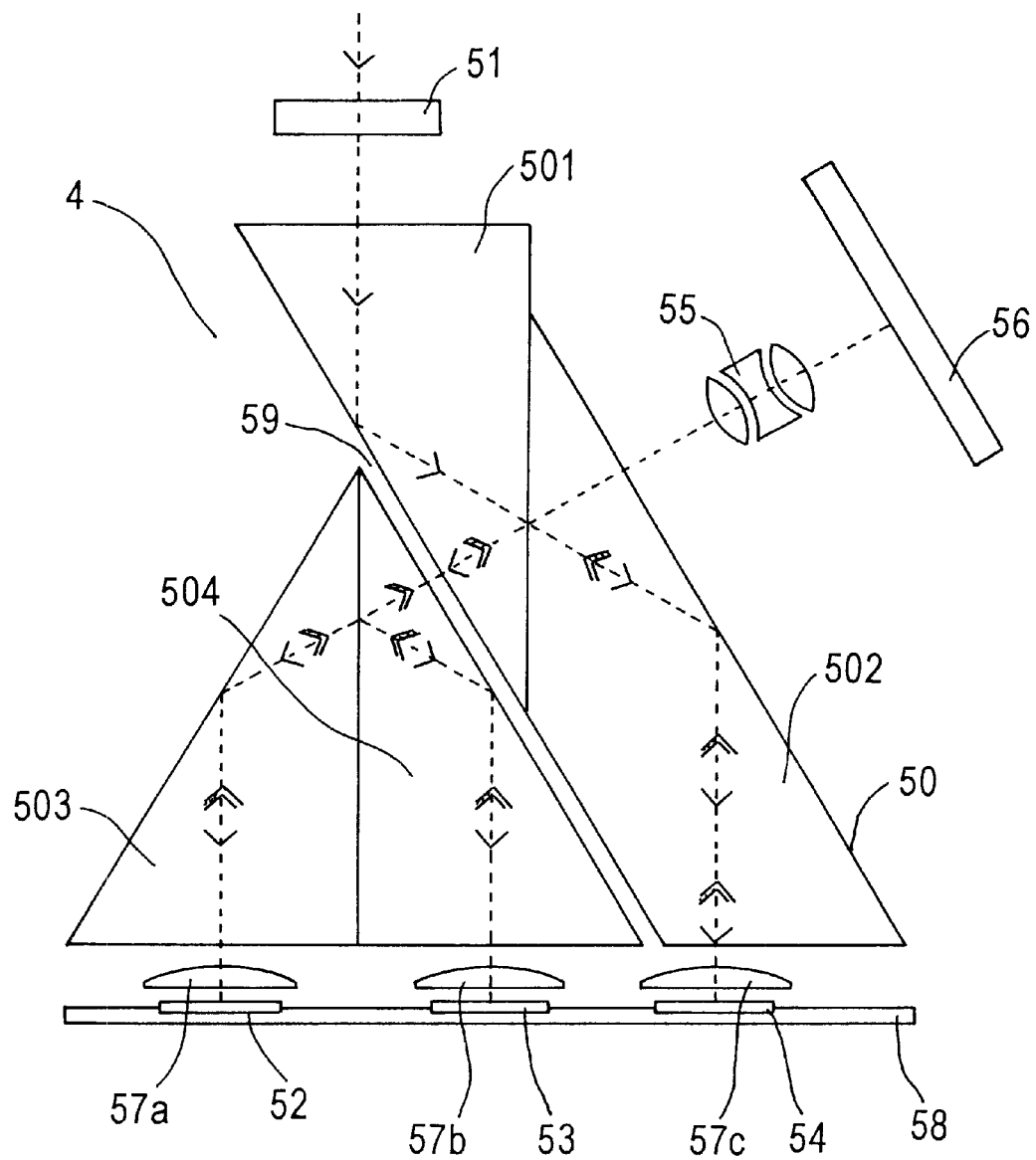
FIG. 5A shows the second embodiment of the present invention.

In FIG. 5A, there is shown the second embodiment of the present invention. The projecting system shown in the FIG. 5A includes a light generating device (not shown in the figure), a beam polarization convert 51, a light splitting and synthesizing device 50, a red light reflective liquid crystal panel 52, a green light reflective liquid crystal panel 54, a blue light reflective liquid crystal panel 53 and a projecting lens. The light splitting and synthesizing device 50 is able to split a white light to three color beams. The color beams are modulated by three different color reflective liquid crystal panels respectively. The splitting and synthesizing device 50 then synthesizes three color projecting beam, which are reflected by the panels, to a projecting light. Compared with the first embodiment, there are two differences. The first one is that the light splitting and synthesizing device 50 have a first component 501, a second component 502, a third component 503 and a fourth component 504. The relative positions of the Four component are shown in FIG. 5A. Particularly, the second difference is that there is a gap 59 between the fourth component 504 and the right hand side component set 501, 502, in order to let the lights be perfectly reflected by the side of fourth component 504. In addition, due to the particular arrangement of the light splitting and synthesizing device, all the three color reflective liquid crystal panels can be formed in one substrate 58. Accordingly, the supporting circuitry can also be formed in the same substrate 58. The second embodiment further simplifies the assembly and alignment of the projecting system. The second embodiment improves the stability of the projecting system.

Figure 5B:
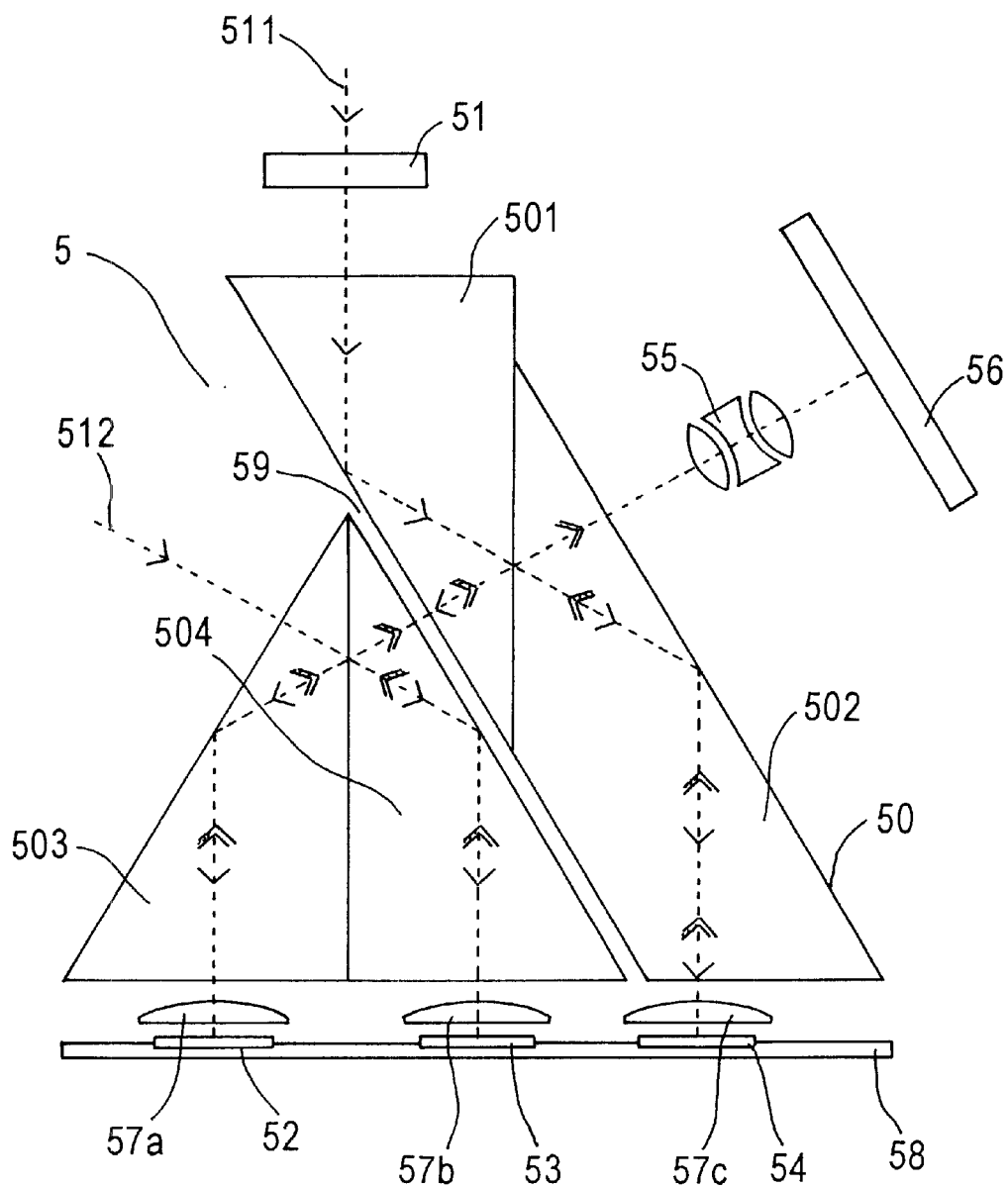
FIG. 5B shows the third embodiment of the present invention.

The third embodiment of the present invention is shown in FIG. 5B. The principles and beneficial points of the third embodiment is similar to the second embodiment. There are two light incoming ports in the light splitting and synthesizing device 50. The green light 511 are emitted to one light incoming port. The red and blue lights are emitted to the other light incoming port. The three lights are modulated to three color projecting beams and finally be synthesized to a projecting light for projecting to the screen 56 via the projecting lens 55. By utilizing two light incoming ports in the third embodiment, the coating layers formed between the components can be simplified. In this case, the space of the projecting system can be saved, and the alignment of the projecting system can be improved by a base Integrated circuit board. Furthermore, the cost of the projecting system can be reduced due to the coating layers are reduced and simplified.

Figure 6A:
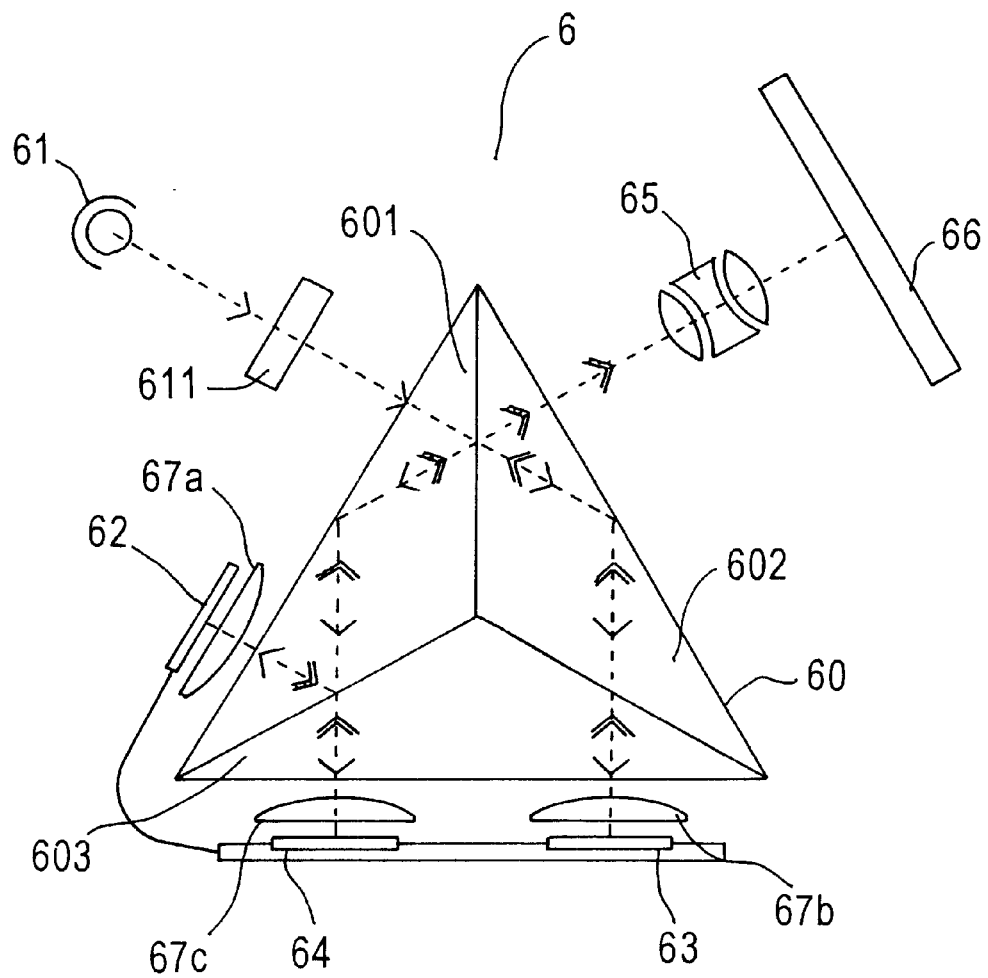
FIG. 6A shows the fourth embodiment of the present invention.

The fourth embodiment of the present invention is shown in FIG. 6A. The principles of the fourth embodiment are similar to the first embodiment. However, the arrangement of the components of the light splitting and synthesizing device 60 is different. As shown in the FIG. 6A, the components implemented in the light splitting and synthesizing device are the same. In this case, the assemble of the light splitting and synthesizing device can be further simplified; and the cost of the projecting system can be reduced.

Figure 6B:
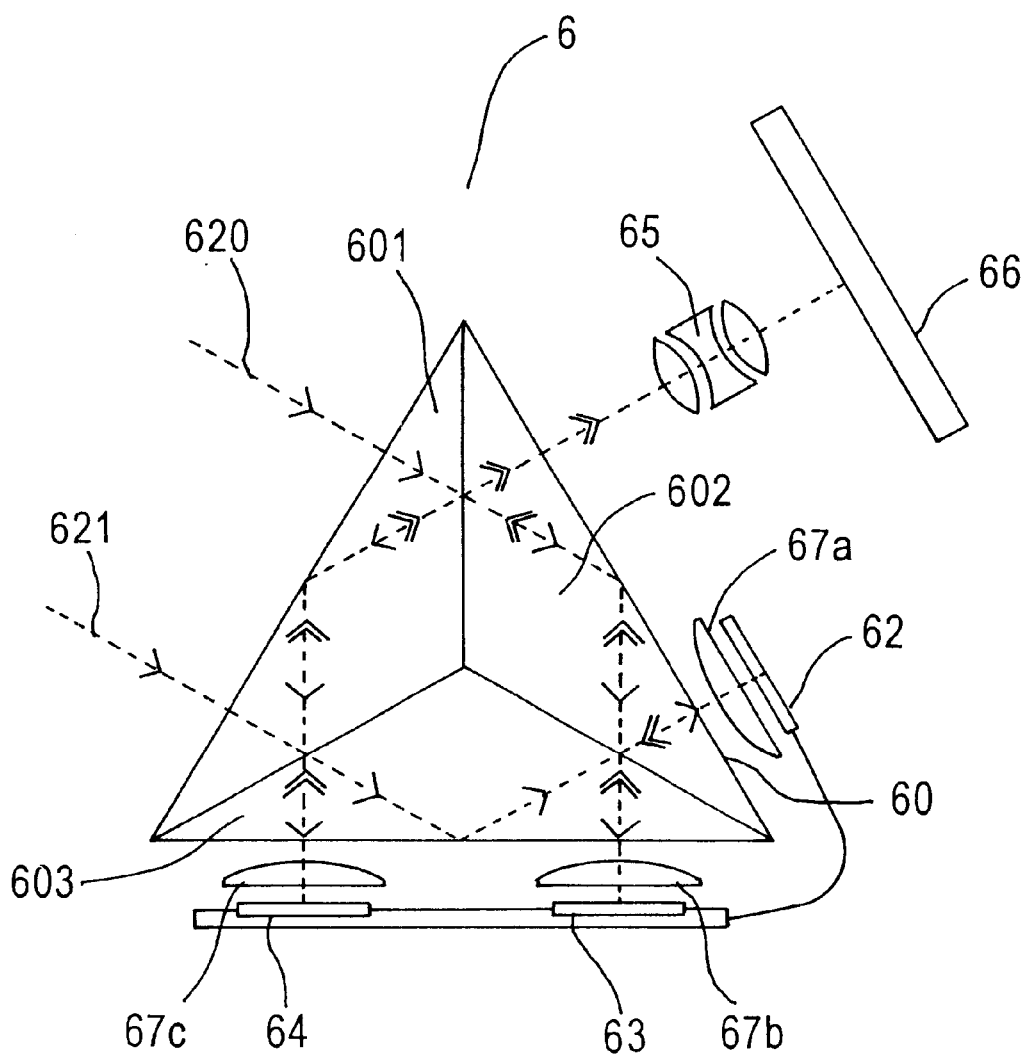
FIG. 6B shows the fifth embodiment of the present invention.

The fifth embodiment of the present invention is shown in FIG. 6B. The light splitting and synthesizing device 60 is similar to the light splitting and synthesizing device illustrated in the fourth embodiment. In addition, the principles and beneficial points are similar to the third embodiment. Particularly, the light splitting and synthesizing device 60 of the fifth embodiment have two light incoming ports in order to let two lights be emitted into. Finally, the projecting beams are still able to be synthesized to generate a projecting light. The projecting light can project to the screen 60 via the projecting lens 65. The fifth embodiment can further reduce the cost of the projecting system since the necessary coating layers formed between the components can be simplified.

Figure 7:
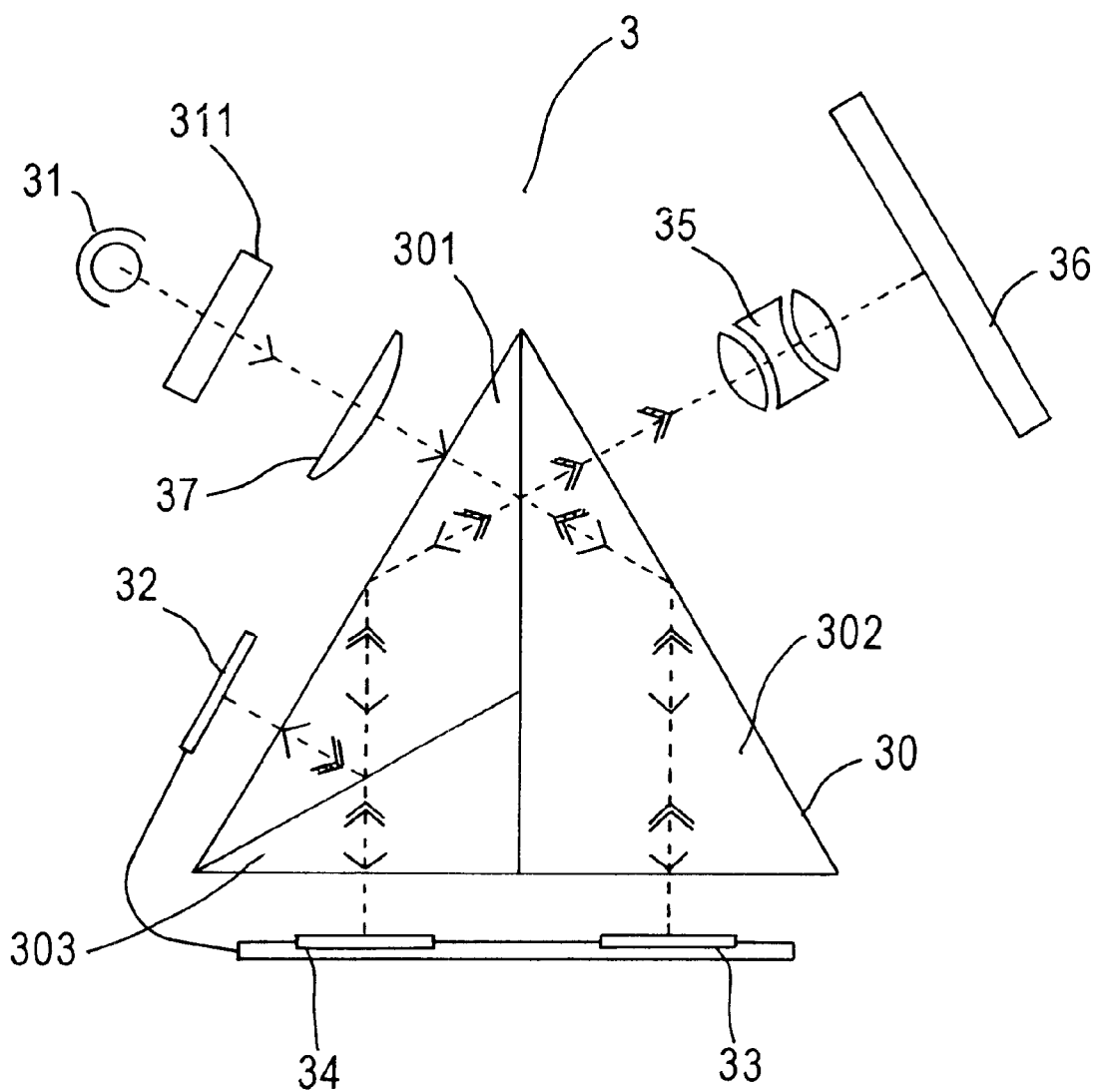
FIG. 7 shows the sixth embodiment of the present invention.

At last, the sixth embodiment of the present invention is shown in FIG. 7. The principles of the sixth embodiment are similar to the first embodiment. The difference between the sixth embodiment and the first embodiment is that the lenses 37a, 37b, 37c, which are utilized in the first embodiment (shown in FIG. 3), referring to respective reflective liquid crystal panels 32, 33, 34, are eliminated. In the sixth embodiment, a lens 37 with the same feature of the lenses 37a, 37b, 37c is placed before the light splitting and synthesizing device 30 in the optical path.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An optical projecting system, comprising:
   a light source for generating light;
   a beam polarization converter optically coupled to said light source for receiving and polarizing said light to obtain polarized light having a predetermined polarization distribution;
   a light splitting and synthesizing device optically coupled to said beam polarization converter for receiving and splitting said polarized light to a first color beam, a second color beam and a third color beam, and for synthesizing a first color projecting beam, a second color projecting beam and a third color projecting beam into projecting light, wherein said light splitting and synthesizing device comprises
      a light incoming port for receiving said polarized light,
      a first transporting port for outputting said first color beam and for receiving said first color projecting beam, a second transporting port for outputting said second color beam and for receiving said second color projecting beam, and a third transporting port for outputting said third color beam and for receiving said third color projecting beam, and
      a light outgoing port for outputting said projecting light;
   a first reflective liquid crystal panel, optically aligned with said first transporting port, for changing a status of said first color beam and outputting said first color projecting beam to said first transporting port;
   a second reflective liquid crystal panel, optically aligned with said second transporting port, for changing a status of said second color beam and outputting said second color projecting beam to said second transporting port;
   a third reflective liquid crystal panel, optically aligned with said third transporting port, for changing a status of said third color beam and outputting said third color projecting beam to said third transporting port; and
   a projecting lens, optically aligned with said light outgoing port, for receiving and transmitting said projecting light;
   wherein said light splitting and synthesizing device further comprises:
      a first component for transmitting lights, having said light incoming port and said first transporting port;
      a second component for transmitting lights, having said light outgoing port and said second transporting port, a polarization beam splitting coating layer being formed between said first component and said second component, wherein said polarization beam splitting coating layer allows said second color beam passing through and reflects the other color beams; and
      a third component for transmitting lights, having said third transporting port, a dichroic splitting coating layer being formed between said third component and said first component, wherein said dichroic splitting coating layer allows said third color beam passing and reflects the other color beams.

2. The optical projecting system of claim 1, wherein a cross section of said light splitting and synthesizing device is triangular in shape.

3. The optical projecting system of claim 2, wherein cross sections of said first component, said second component and said third component are isosceles triangular.

4. The optical projecting system of claim 3, wherein said beam polarization converter modulates a second color component of said polarized light to have a first polarization direction and first and third color components of said polarized light to have a second polarization direction.

5. The optical projecting system of claim 4, wherein the first and third reflective liquid crystal panels modulate the first color and third color beams to obtain the first color and third color projecting beams, respectively, which have the first polarization direction, and the second reflective liquid crystal panel modulates the second color beam to obtain the second color projecting beam which has the second polarization direction.

6. The optical projecting system of claim 5, wherein the polarization beam splitting coating layer is positioned facing the light incoming port for receiving said polarized light and splitting said second color beam from said polarized light, and all of said first, second and third color projecting beams are guided inside said light splitting and synthesizing device back to the polarization beam splitting coating layer where the projecting beams are synthesized into said projecting light.

7. The optical projecting system of claim 1, wherein said second liquid crystal panel and said third liquid crystal panel are formed on a common substrate.

8. The optical projecting system of claim 7, further comprising controlling circuitry formed in said substrate.

9. The optical projecting system of claim 8, wherein said first reflective liquid crystal panel is connected to said controlling circuitry in said substrate by a cable.

10. The optical projecting system of claim 1, where said first color beam is a red beam.

11. The optical projecting system of claim 1, wherein said first color projecting beam is a red projecting beam.

12. The optical projecting system of claim 1, wherein said second color beam is a green beam.

13. The optical projecting system of claim 1, wherein said second color projecting beam is a green projecting beam.

14. The optical projecting system of claim 1, wherein said third color beam is a blue beam.

15. The optical projecting system of claim 1, wherein said third color projecting beam is a blue projecting beam.

16. The optical projecting system of claim 1, wherein said beam polarization converter modulates a second color component of said polarized light to have a first polarization direction and first and third color components of said polarized light to have a second polarization direction.

17. The optical projecting system of claim 16, wherein the first and third reflective liquid crystal panels modulate the first color and third color beams to obtain the first color and third color projecting beams, respectively, which have the first polarization direction, and the second reflective liquid crystal panel modulates the second color beam to obtain the second color projecting beam which has the second polarization direction.

18. The optical projecting system claim 17, wherein the polarization beam splitting coating layer is positioned facing the light incoming port for receiving said polarized light and splitting said second color beam from said polarized light, and all of said first, second and third color projecting beams are guided inside said light splitting and synthesizing device back to the polarization beam splitting coating layer where the projecting beams are synthesized into said projecting light.

19. The optical projecting system of claim 1, wherein all of said first, second and third components are triangular in cross section, and together define a triangular cross section of said light splitting and synthesizing device, said polarization beam splitting coating layer being formed inside said light splitting and synthesizing device at an interface between one side of said first component and said second component, and said dichroic splitting coating layer being formed inside said light splitting and synthesizing device at an interface between said third component and another side of said first component.

20. The optical projecting system of claim 19, wherein said light splitting and synthesizing device consisting of said first, second and third components, said polarization beam splitting coating layer and said dichroic splitting coating layer.

21. An optical projecting system, comprising:
  a light source for generating light;
  a beam polarization converter optically coupled to said light source for receiving and polarizing said light to obtain polarized light having a predetermined polarization distribution;
  a light splitting and synthesizing device optically coupled to said beam polarization converter for receiving and splitting said polarized light to a first color beam, a second color beam and a third color beam, and for synthesizing a first color projecting beam, a second color projecting beam and a third color projecting beam into projecting light, wherein said light splitting and synthesizing device comprises
    a light incoming port for receiving said polarized light,
    a first transporting port for outputting said first color beam and for receiving said first color projecting beam, a second transporting port for outputting said second color beam and for receiving said second color projecting beam, and a third transporting port for outputting said third color beam and for receiving said third color projecting beam, and
    a light outgoing port for outputting said projecting light;
  a first reflective liquid crystal panel, optically aligned with said first transporting port, for changing a status of said first color beam and outputting said first color projecting beam to said first transporting port;
  a second reflective liquid crystal panel, optically aligned with said second transporting port, for changing a status of said second color beam and outputting said second color projecting beam to said second transporting port;
  a third reflective liquid crystal panel, optically aligned with said third transporting port, for changing a status of said third color beam and outputting said third color projecting beam to said third transporting port; and
  a projecting lens, optically aligned with said light outgoing port, for receiving and transmitting said projecting light;
  wherein said light splitting and synthesizing device further comprises:
    a first component for transmitting lights, having said light incoming port;
    a second component for transmitting lights, having said light outgoing port and said second transporting port, a polarization beam splitting coating layer being formed between said first component and said second component, wherein said polarization beam splitting coating layer allows said second color beam passing through and reflects the other color beams;
    a third component for transmitting lights, having said first transporting port, a dichotic split coating layer being formed between said third component and a fourth component, wherein said dichotic splitting coating layer allows said first color beam passing and reflects the other color beams; and
    said fourth component for transmitting lights, having said third transporting port;
  wherein the first component and the second component form a first set of components, the third component and the fourth component form a second set of components.

22. The optical projecting system of claim 21, further comprising a gap between said fourth component and the first set of components.

23. The optical projecting system of claim 21, wherein said first reflective liquid crystal panel, said second reflective liquid crystal panel and said third reflective liquid crystal panel are formed on a common substrate.

24. The optical projecting system of claim 23, wherein said first, second and third reflective liquid crystal panels are disposed side by side on a planer surface of said substrate, and receive the respective first, second and third color beams from the respective transporting port and return the respective projecting beams thereto along substantially parallel optical paths.

* * * * *